US008763065B2

(12) United States Patent
Walter et al.

(10) Patent No.: US 8,763,065 B2
(45) Date of Patent: Jun. 24, 2014

(54) VIDEO INTEGRATION

(75) Inventors: Edward Walter, Boerne, TX (US); Steven M. Wollmershauser, San Antonio, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1182 days.

(21) Appl. No.: 11/481,628

(22) Filed: Jul. 5, 2006

(65) Prior Publication Data

US 2008/0022341 A1    Jan. 24, 2008

(51) Int. Cl.
*H04N 7/173* (2011.01)
*H04N 7/16* (2011.01)

(52) U.S. Cl.
USPC .............................. 725/133; 25/141

(58) Field of Classification Search
CPC ............ H04N 21/237; H04N 21/2347; H04N 21/4108; H04N 21/44227
USPC ...................... 725/10, 12, 133, 141
See application file for complete search history.

(56) References Cited

U.S. PATENT DOCUMENTS

| | | | |
|---|---|---|---|
| 6,320,588 B1 * | 11/2001 | Palmer et al. .................. | 345/473 |
| 6,774,926 B1 * | 8/2004 | Ellis et al. .................... | 348/14.01 |
| 7,565,680 B1 * | 7/2009 | Asmussen ..................... | 725/135 |
| 2004/0117429 A1 | 6/2004 | Karaoguz et al. | |
| 2004/0148353 A1 | 7/2004 | Karaoguz et al. | |
| 2004/0150748 A1 * | 8/2004 | Phillips et al. ................ | 348/565 |
| 2005/0097612 A1 | 5/2005 | Pearson et al. | |
| 2005/0213502 A1 | 9/2005 | Convertino et al. | |
| 2005/0216949 A1 * | 9/2005 | Candelora et al. ........... | 725/134 |
| 2006/0031550 A1 | 2/2006 | Janik et al. | |
| 2006/0195881 A1 * | 8/2006 | Segev et al. ................... | 725/116 |
| 2006/0209857 A1 * | 9/2006 | Hicks, III ..................... | 370/401 |
| 2007/0113258 A1 * | 5/2007 | Earle ............................. | 725/131 |
| 2008/0022322 A1 * | 1/2008 | Grannan et al. ............... | 725/78 |

FOREIGN PATENT DOCUMENTS

| | | |
|---|---|---|
| EP | 1443765 A2 | 8/2004 |
| JP | 2002217937 | 8/2002 |
| WO | WO-0119084 A1 | 3/2001 |
| WO | WO-2008005205 A2 | 1/2008 |

OTHER PUBLICATIONS

International Application Serial No. PCTUS2007/014625, International Search Report mailed Dec. 13, 2008, 6 pgs.
International Application Serial No. PCTUS2007/014625, Written Opinion mailed Dec. 13, 2008, 7 pgs.

* cited by examiner

*Primary Examiner* — Nasser Goodarzi
*Assistant Examiner* — Hyun Hong
(74) *Attorney, Agent, or Firm* — Guntin & Gust, PLC; Ed Guntin

(57) ABSTRACT

Techniques for Internet Protocol (IP) video integration within a home viewing network are provided. Locally acquired IP video content is assigned a channel on a television (TV). The assigned channel is associated with a same source input of the TV that includes other channels that present externally acquired TV programming content. The TV programming content and the local IP video content can both be accessed on a TV over the same source input via references to appropriately assigned channels.

14 Claims, 6 Drawing Sheets

VIDEO INTEGRATION

FIELD

This application relates to multimedia stream management, and more specifically to techniques for video integration within a residential viewing environment for Internet Protocol (IP) Television (IPTV).

BACKGROUND

Consumers have a variety of choices and options for watching television programming, Video-On-Demand (VOD) content, Digital Versatile Disk (DVD) content, personal or custom video content, and the like. Televisions (TV's) and/or Set-Top Boxes (STB's), Digital Video Recorders (DVR's), cable boxes, satellite boxes, multimedia servers, etc. combine to provide an environment in which consumers can enjoy a plethora of video content choices within their home.

However, integrating and viewing each of these types of video selections can be cumbersome, non intuitive, expensive, and in many cases space limiting because of the variety of devices needed to accomplish proper interconnection to a TV and because various connection cords required to attach and to power those devices. For example, to typically watch a streaming home video on a TV within a residential environment, a consumer may be required to interface a multimedia server, which is separate from the consumer's cable box. The multimedia server and the cable box are each physically located in close proximity to the TV and connected directly to the TV and each have a specific connection arrangement to the TV and perhaps to each other. Moreover, proper connection and physical configuration are not all that is needed to properly view the streaming home video. That is, the TV or the STB often has to be manually switched by the consumer to a different input source entirely from the normal TV programming before the streaming home video being supplied over the multimedia server can actually be viewed on the TV.

So, watching TV programming and IP live home security videos on the same TV often requires multiple types of STB's, the proper physical space for the STB's, the proper connection wires and power outlets to interface the STB's, and requires knowledge about the TV for purposes of manually switching back and forth between proper input sources on that TV, which represent IP live home security video being streamed to the TV and normal TV programming.

As a result, integration of streaming IP live home security video within a residential environment is not as pervasive as it could be within the industry and it is usually reserved for consumers with higher technical aptitudes to integrated multiple devices and higher personal incomes to buy those multiple devices. Generally, the average consumer is more likely to press the TV/Video button to watch IP live home security videos or try to record it to a DVD like he/she may do with a DVR interfaced to their TV's. Yet, this also requires the consumer to have a DVR or DVD writing device and this also adds steps in the process, which the consumer must learn and know how to perform. So, even this alternative approach is really not as automated and integrated as it should be.

Thus, it is advantageous to provide techniques for more efficient video integration within a residential environment.

BRIEF DESCRIPTION OF DRAWINGS

The present disclosure is illustrated by way of example and not limitation in the figures of the accompanying drawings, in which like references indicate similar elements and in which.

DETAILED DESCRIPTION

In the following description, for purposes of explanation, numerous specific details are set forth in order to provide a thorough understanding of an embodiment of the present disclosure. It will be evident, however, to one skilled in the art that the present disclosure may be practiced without these specific details.

Figure 1:
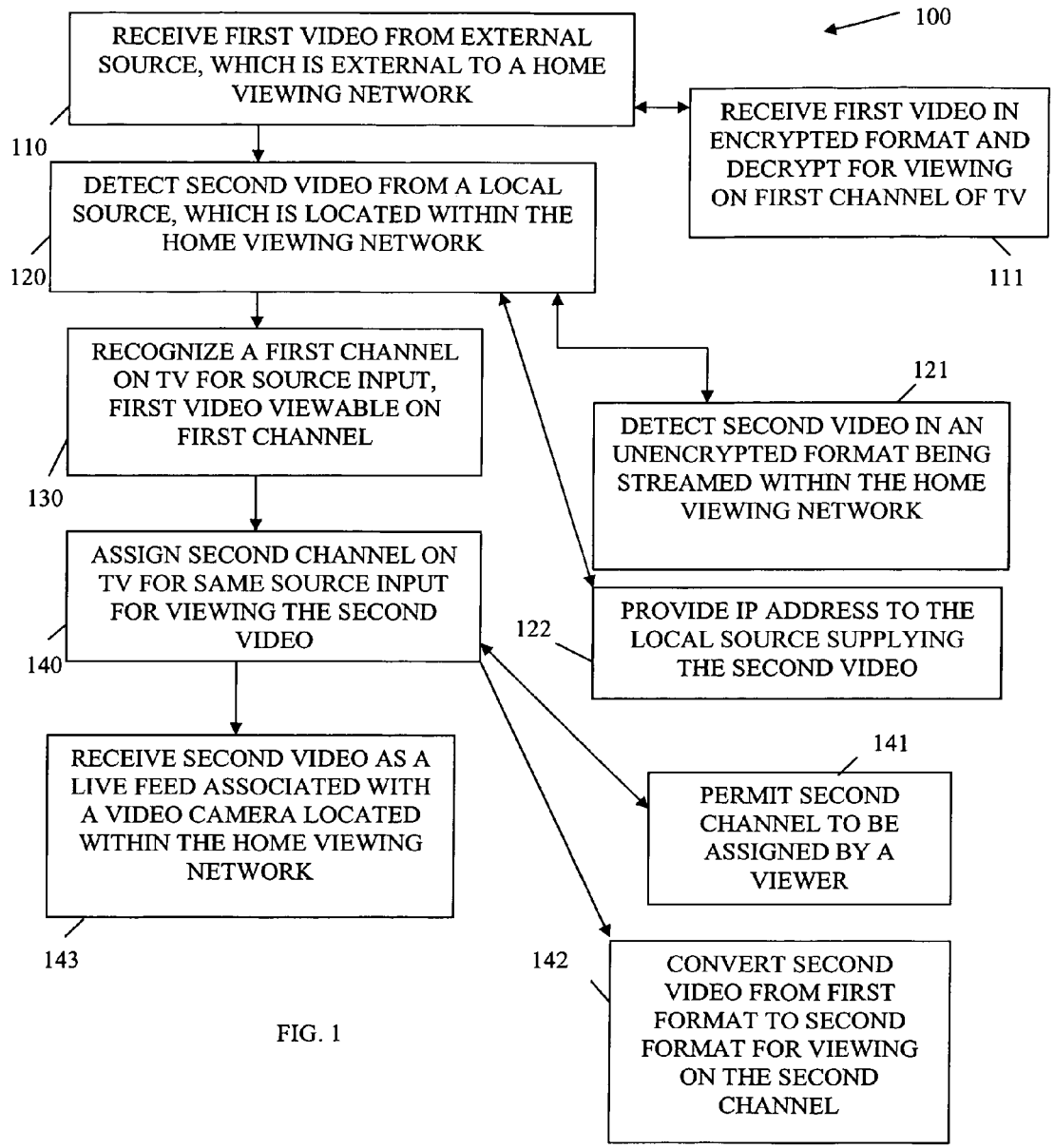
FIG. 1 is a diagram of a method for integrating Internet Protocol (IP) video content within a home viewing network, according to an example embodiment of the disclosure.

FIG. 1 is a diagram of a method 100 for integrating Internet Protocol (IP) video content within a home viewing network, according to an example embodiment of the disclosure. The method 100 (herein after referred to as "IP video integration service") is implemented in a machine-accessible medium and is operational over a network. The network may be wired, wireless, or a combination of wired and wireless.

As used herein a "home viewing network" refers to a local area network (LAN) that has a video server (e.g., an Internet Protocol (IP) Television (TV) server referred to as an IPTV server, etc.), a network interface (residential gateway, router, etc.), one or more Set-Top Boxes (STB's), and one or more viewing devices. The video server receives and broadcasts, within the home network, video streams associated with TV programming (e.g., broadcasts, pay-per view broadcasts, Internet video broadcasts, etc.). The video server also broadcast local IP video originating from with the home viewing network. That is, the IP video service (implemented in an IP video STB) receives encrypted IP video content from external TV programming sources (also referred to as "IPTV service provider") and from local sources supplying local video content.

In some embodiments, the home viewing network may simply be a STB and a viewing device; that is, a LAN is not necessarily required since the IP feed may be brought directly into the STB and presented on a TV. So, it is to be understood that in some cases the home viewing network may comprise a STB and a TV. The home viewing network may also include a STB, a network interface, and a TV.

An "unencrypted video stream" is one in which video content is not in an encrypted format that is typically associated with television programming or pay-per-view programming. That is, an unencrypted video stream is one that is not encrypted in a format associated with an IP service provider and the programming they supply. It may originate from a home video camera or from downloads off the Internet and other sources and it is not encrypted. It may be compressed for easier transmission or storage but it is not encrypted.

According to an embodiment, the IP video integration service is implemented within one or more STB's situated within and interfaced to the home viewing network. The STB may be viewed as a modified IPTV-enabled STB that receives video streams within the home network. A viewer interacts with the STB via the display screen presented on the TV and a remote control device.

According to an embodiment, the video streams are received over an Ethernet feed that can include externally-acquired encrypted video content from IPTV service providers and unencrypted local IP video content from local sources within the home viewing network.

It is however noted that in some cases the STB may be enabled to receive the IP video streams via a wireless connection from a wireless transmitter situated within the home viewing network. It is also to be noted that the STB can be viewed by any IP-enabled device situated and operable within the home viewing network. So, if DVD players or other devices support IP transmissions these devices may also be viewed as the STB that implements the processing of the IP video integration service or that are capable of interacting with another device that includes the video integration service. These IP-enabled video stream devices may also convert analogue to IP format before streaming the video streams over the home viewing network.

As will be demonstrated herein and below, the processing of the IP video integration service permits, among other things, the ability to associate a channel number associated with the TV to a locally distributed video stream. That video stream does not have to be encrypted in the same manner that other streams are that are associated with IPTV programming, which typically are assigned to predefined channel numbers on the TV. Such feature function permits local video to be integrated into a same source input of a TV (via an IPTV-enabled STB) and assigned its own unique channel number for purposes of viewing. This eliminates the need for a conventional media server or for a pressed DVD that plays in a DVD player if it has an IP video output; and this also eliminates the need for manually switching between different source input feeds associated with the TV for purposes of viewing local IP video, since the local video is viewable on the same source input feed with the embodiments presented herein.

Initially, at 110, the IP video integration service receives a first IP video from an external source. The external source is external to the home network. In an embodiment, the external source may be an IPTV service provider. The external source provides TV programming to the home viewing network. The first video is associated with that TV programming. According to an embodiment, at 111, the first video is received in encrypted format, which is decrypted for viewing on the TV and transmitted using IP over the home viewing network via an Ethernet connection of via a wireless transmission.

At 120, the IP video integration service detects a second IP video from a local source within the home viewing network. The local source may be a security camera or a personal computer or laptop computer situated within the home network that broadcasts or transmits the second video to the IP video integration service using IP. Again, this transmission may occur over the same Ethernet network feed (connection) as the encrypted first video is or over the same wireless transmission as the encrypted first video. In some cases, the transmission may be mixed, meaning the second video may be sent wirelessly and the first video sent over a wired connection. In an embodiment, at 121, the second video is detected in an unencrypted format that is being streamed within the home viewing network from the local source to the video integration service.

In an embodiment, at 122, the IP video integration service may provide an IP address to the local source, such that the any subsequent video transmitted from the local source is associated with the same detected IP address. The IP address may be dynamically supplied from the local router associated with all sources or it may be assigned by a STB, which includes the IP video integration service). In some cases, a viewer may manually supply the IP address for the local source via interface screens presented to the viewer on the TV and interacted with via a remote control device.

At 130, the IP video integration service recognizes a first channel on the TV for a specific source input feed of the TV that is associated with the first video. The first video is viewable through this source input feed on the TV when the first channel is selected for viewing by the viewer. It is also noted that the IPTV programming source or provider service may supply a plurality of video, where each video is assigned a predefined channel number on the TV. Therefore, a single first video is presented for purposes of illustration and should not be considered as limiting.

At 140, the IP video integration service assigns a second channel number on the TV for the same source input feed for viewing the second video. So, the same source input feed of the TV that permits TV programming associated with the first video may be used to present the second video associated with a local source. The first video is viewable via the first channel number and the second video is viewable via the second channel number or a picture within a picture (PIP) stream on the same source input feed.

Traditionally, different types of video, and more particularly unencrypted video, have only been presentable on TV's using a different source input feed from what is associated with the normal TV programming. Embodiments of this invention remove this cumbersome limitation and permit local unencrypted IP video to be presented on the same source input feed of the TV as the other TV programming using a different channel selection.

According to an embodiment, at 141, the IP video integration service may permit the second channel to be assigned by a viewer. That is, an interface presented to a viewer over the TV may permit the viewer, using a remote, to not only assign an IP address to the local source that supplies the second video but to also assign a specific channel for viewing the second video.

In some cases, the second video may be in a different format, such as when it is received from a camera and it may be in a proprietary format or even compressed format. In these situations, at 142, the video integration service may automatically detect the first format of the second video and recognize that for viewing purposes the first format should be converted to a second format. So, the IP video integration service may convert the second video automatically from its native and first format into a format that the TV uses on the source input feed associated with the first video.

Also, at 143, the IP video integration service may receive the second video as a live feed associated with a video camera located within the home viewing network and being used to actively monitor images for some portion of the physical premises associated with the home viewing network. In this manner, the viewer may have a video camera installed on his/her premises and the live video associated with that camera may be captured and streamed to a viewer-defined channel over a same TV source input feed that the viewer uses to watch normal TV programming. The viewer switches between normal TV programming and the live feed by switching channels on the remote associated with the TV and without switching source input feeds.

Figure 2:
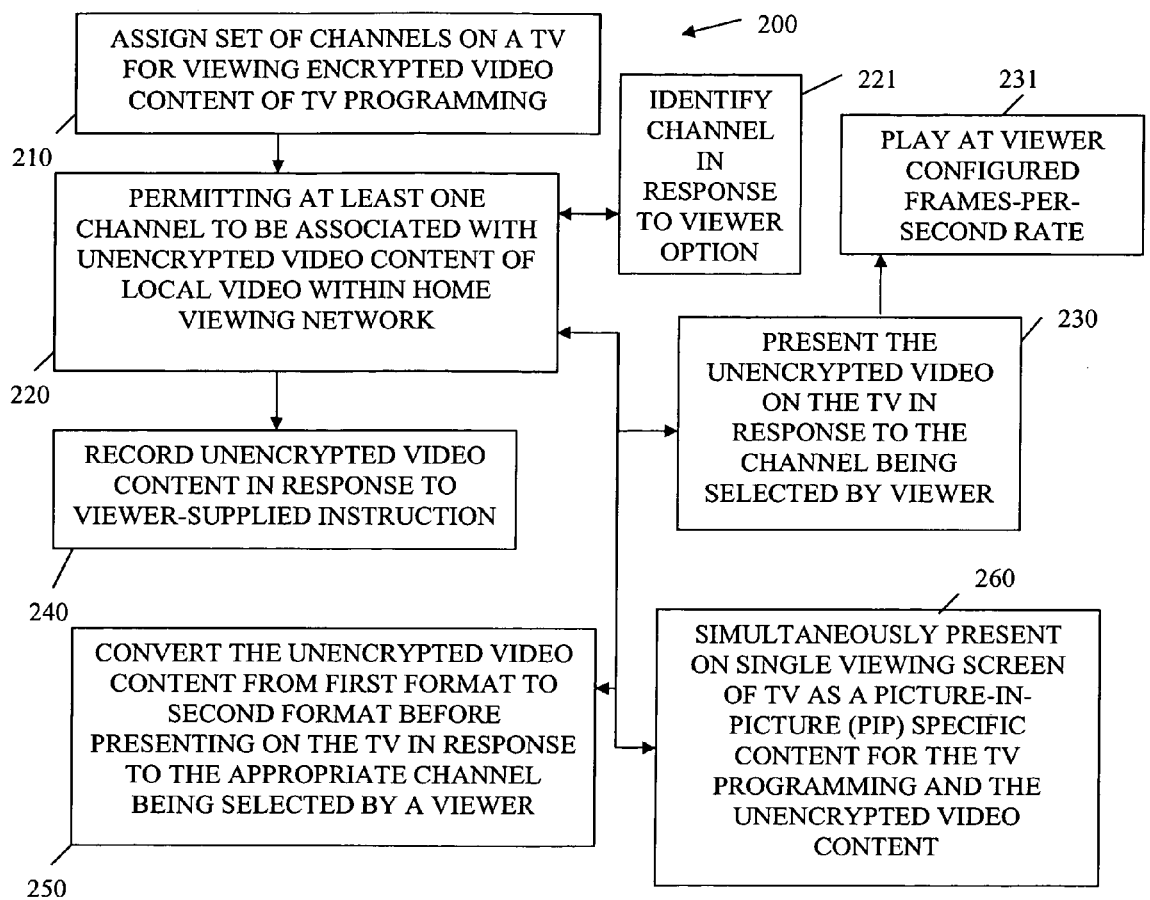
FIG. 2 is a diagram of another method for integrating IP video content within a home viewing network, according to an example embodiment of the disclosure.

FIG. 2 is a diagram of another method 200 for integrating IP video content within a home viewing network, according to an example embodiment of the disclosure. The method 200 (hereinafter referred to as "front-end TV service") is implemented in a machine-accessible and readable medium and is operational over a network. The network may be wired, wireless, or a combination of wired and wireless. The front-end TV service presents an alternative perspective to the IP video integration service represented by the method 100 of the FIG. 1.

At 210, the front-end TV service initially assigns asset of channels on a TV (set of channel numbers) associated with a viewer to programming associated with encrypted video content. That programming received from an external source, such as an IPTV content or service provider.

At 220, the front-end TV service permits at least one channel from the set of channels to be associated with unencrypted video content, which is associated with local IP video transmitted within the home viewing network. This local IP video content may be home videos associated with a viewer or it may content the viewer acquires over the Internet of from removable media (e.g., DVD, etc.) that is, which the viewer then uses the home viewing network to transmit that local video to the front-end TV service using IP over wired connections, such as Ethernet lines and/or over wireless connections, such as a wireless transmitter/router.

According to an embodiment, at 221, the channel identified as being used with the local unencrypted video content may be assigned in response to a viewer instruction or option. So, a variety of channels that are unused with the encrypted IP video content may be presented to a viewer and the viewer may select the available channel number to be associated with the local unencrypted IP video content.

The set of channels are then accessible on a TV of the viewer over the same source input feed of the TV. At least one of the channels is used to play on the TV the local unencrypted IP video content and a number of the remaining channels are used to play the encrypted IP video content. The viewer can view the encrypted IP video content and the unencrypted IP video content on the TV over the same source input feed by accessing different channels within the same source input feed.

At 230, the front-end TV service may present the unencrypted IP video content on the TV in response to receiving the channel assigned to the unencrypted IP video from the viewer. That is, the viewer may use a remote control device to change the TV channel to the channel associated with the unencrypted IP video content and in response to that viewer selection; the front-end TV service presents the unencrypted IP video content on the TV for viewing.

In an embodiment, at 240, the front-end TV service may also record the unencrypted IP video, such as on a DVR hard drive, in response to a viewer-supplied instruction. That instruction may identify the channel associated with the unencrypted IP video content, a date and time for recording, and a length of time for the recording. The instruction is then processed when the conditions associated with the instruction are met. Thus, a viewer can record local IP video content in the same manner and over the same source input feed that the viewer may use to record the traditional encrypted IP video content associated with TV programming.

According to another embodiment, at 250, the front-end TV service may convert the unencrypted IP video content from a first format to a second format before the unencrypted IP video content is presented on the TV. This conversion can occur dynamically and in real time when the viewer selects the channel assigned to the unencrypted IP video content.

In still another embodiment, at 260, the front-end TV service may simultaneously present on a single viewing screen of the TV a picture-in-picture (PIP), which has the unencrypted IP video content and specific programming associated with the encrypted IP video content. So, the viewer may be watching a channel associated with the specific programming or a channel associated with the unencrypted IP video content and may access a command instruction via a remote that instructs the front-end TV service to present the other content (not currently active on the channel being currently viewed) within the same picture. Essentially, a PIP feature for local area content is implemented to allow the local unencrypted IP video content to be viewed simultaneously with the external encrypted IP video content associated with an external feed of TV programming.

Figure 3:
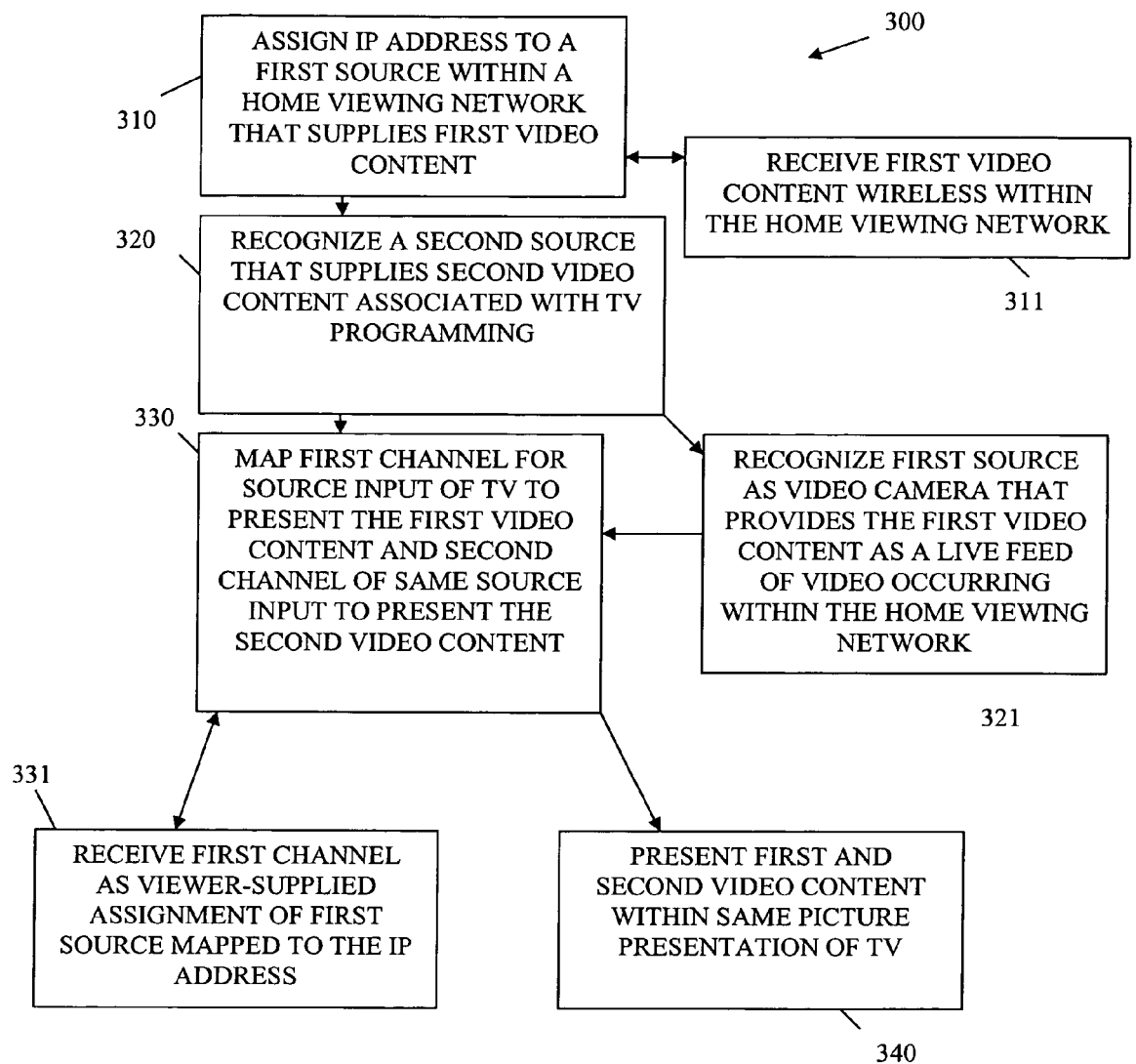
FIG. 3 is a diagram of still another method for integrating IP video within a home viewing network, according to an example embodiment of the disclosure.

FIG. 3 is a diagram of still another method 300 for integrating IP video streams within a home viewing network, according to an example embodiment of the disclosure. The method 300 is implemented as instructions within a machine-accessible and readable medium and is operational over a network. The network may be wired, wireless, or a combination of wired and wireless. The instructions when executed by a machine within the home viewing network represent an alternative processing perspective to the IP video integration service represented by the method 100 of the FIG. 1 and the front-end TV service represented by the method 200 of the FIG. 2.

The instructions may be implemented on a removable medium and subsequently interfaced to a machine where the instructions are uploaded within the machine and processed. Alternatively, the instructions may be prefabricated within memory or storage of the machine and loaded for execution when the machine is initiated or booted. In still another arrangement, the instructions may be downloaded from a network storage location or other network machine to a target machine on the network and processed. In yet another situation, the instructions may be remotely processed over a network on one machine at the instruction and on behalf of another different network machine.

At 310, the instructions assign an IP address to a first source within a home viewing network that supplies first video content. The IP address permits a local source or device that provides or transmits local or first IP video content to be recognized uniquely by the instructions from other IP video content associated with a second source that supplies external IP video content associated with TV programming. According to an embodiment, at 311, the first IP video content may be received wirelessly within the home viewing network. For example, a wireless transmitter or router may broadcast the first IP video content throughout the home viewing network coverage area and the instructions may be interfaced to a STB that is capable of receiving the broadcasted first IP video content. It is noted that the transmission of the first IP video content does not have to be wireless and in some cases it may be a wired transmission of the first IP video content from a local source to the instructions. The first IP video is transmitted within the home viewing network using IP communications.

At 320, the instructions also recognize a second source that supplies second IP video content associated with TV programming. The second source may be an IPTV content or service provider. Moreover, the second source may actually be an intermediary such as a residential gateway or an IP content server that interfaces directly with the external content or service provider and then relays or transmits the second IP video content to the instructions within the home viewing network using IP over a wired Ethernet connection or wirelessly via a wireless transmitter/router.

According to an embodiment, at 321, the instructions may recognize the first source as an IP video camera that provides the first IP video content as a live feed of video occurring within some portion of the home viewing network. Thus, the first source can be devices that specialize in capturing video, such as IP cameras.

At 330, the instructions map a first channel for source input associated with a TV to the first IP video stream and map a second channel for the same source input of the TV to the second IP video stream. When the first channel is selected on the TV the first IP video stream is presented and when the second channel is selected on the TV the second IP video stream is presented.

In some cases, at 331, the instructions may permit the first channel to be received as a viewer-supplied assignment for the first source, which is mapped to the IP address. So, the viewer may supply the assignment of the first channel for the instructions and may do this via the IP address of the first source.

In an embodiment, at 340, the instructions may present the first and second IP video content streams within a same picture presentation on the TV. This PIP provides a novel presentation on a single channel to depict local IP video content simultaneously with externally acquired IP video content associated with external TV programming.

Figure 4:
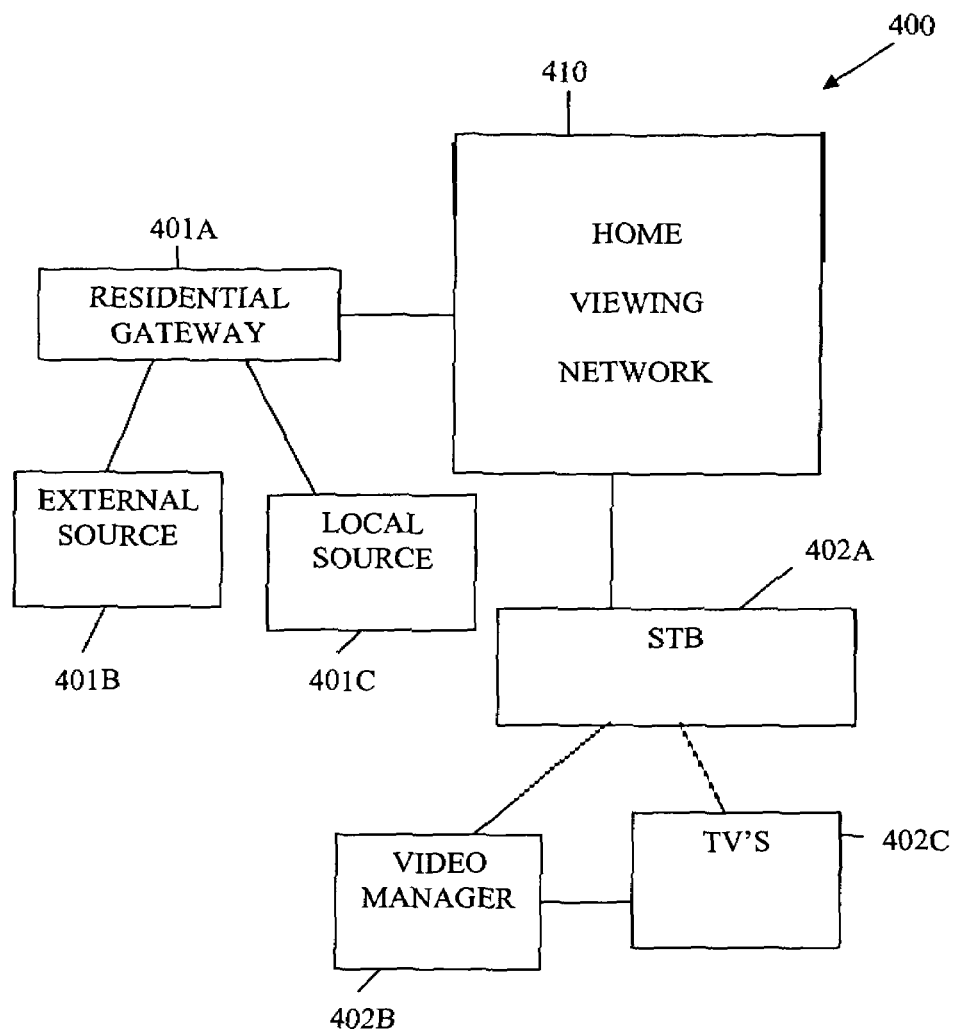
FIG. 4 is diagram of an IP video integration system, according to an example embodiment of the disclosure.

FIG. 4 is diagram of an IP video integration system 400, according to an example embodiment of the disclosure. The IP video integration system 400 is implemented within a machine readable medium and on a plurality of machines within a home viewing network. The IP video integration system 400 implements, among other things, the processing associated with the methods 100, 200, and 300 of the FIGS. 1-3, respectively.

The IP video integration system 400 includes a residential gateway 401A and a Set-Top-Box 402A. The residential gateway 401A is interfaced with an external content source or service provider 401B and a local content source provider 401C. The STB 402A is interfaced to a video manager 402B and to one or more TV's 402C. The residential gateway 401A and the STB 402A communicate and interact with one another over a home viewing network 410. Each of these components and their interactions with one another will now be discussed in turn.

The residential gateway 401A is equipped to receive content IP video streams or feeds from IP-enabled sources. For example, encrypted content associated with IPTV programming supplied from an external source 401B (e.g., an IP content or service provider) may be channelled through the residential gateway 401A and transmitted over the home viewing network 410 to the STB 402A. In a similar manner, the unencrypted and locally acquired IP video content may be channelled through the residential gateway 401A from a local source 401C over the home viewing network 410 to the STB 402A using IP communications via a wired Ethernet connection of via a wireless transmitter/router.

It is noted that FIG. 4 is presented for purposes of illustration only and that other configurations may be achieved without departing from the teachings of the invention. Thus, the external source 401B may be directly fed into an IP-enabled STB 402A (not shown in FIG. 4). So, the specific illustration presented in FIG. 4 should not be viewed as limiting embodiments of the invention.

The STB 402A is designed to interact with one or more TV's 402C for purposes of presenting encrypted IP video content associated with TV programming acquired from the external source 401B and for purposes of presenting unencrypted IP video content associated with locally acquired and unencrypted IP video content, which is obtained from the local source 401C. The presentation within the TV occurs on the same source input feed of the TV 402C albeit over different channels. The STB 402A is enabled to receive IP transmissions from wired, wireless, or a combination of wired and wireless feeds within the home viewing network. Some example processing associated with the STB 402A was presented above with respect to the methods 100, 200, and 300 of the FIGS. 1-3, respectively.

In an embodiment, the residential gateway 401A and the STB 402A cooperate to assign and recognize a unique IP address associated with the local source 401C. This permits the STB 402A to detect the unencrypted IP video stream and if necessary convert it for proper presentation within the TV 402C when a channel to which the unencrypted IP video stream is selected by a viewer. So, the either the residential gateway 401A or the STB 402A may convert the unencrypted IP video stream from a first native format to a second desired format that is used for proper presentation on the TV 402C.

According to an embodiment, the IP video integration system 400 may also include a video manager 402B. The video manager 402B is an interface that is presented to the viewer of the TV 402C and the viewer interacts or makes selections within the interface using a remote control device associated with either the TV 402C, the STB 402A, or both the TV 402C and the STB 402A. The viewer may perform a variety of useful configurations via the video manager 402B.

For example, the viewer may set an unencrypted local IP video stream for recording by supplying the channel assignment, the data and time for the recording, and the length of the recording to the STB 402A via the video manager 402B interface. The viewer may also assign the specific channel that is to be associated with the unencrypted local IP video stream via the video manager 402B. Furthermore, the viewer may manually supply the IP address of the local source 401C; define the frames-per-second rate for presenting the unencrypted local IP video stream, and the like.

In addition, the STB 402A may supply functionality to the viewer that permits the viewer to view the unencrypted local IP video stream simultaneously with the encrypted IP video stream on a same channel or picture presentation within the TV 402C. This is referred to as a PIP. The PIP permits local unencrypted IP video to be viewed simultaneously within the same screen with encrypted IP video associated with TV programming.

Figure 5:
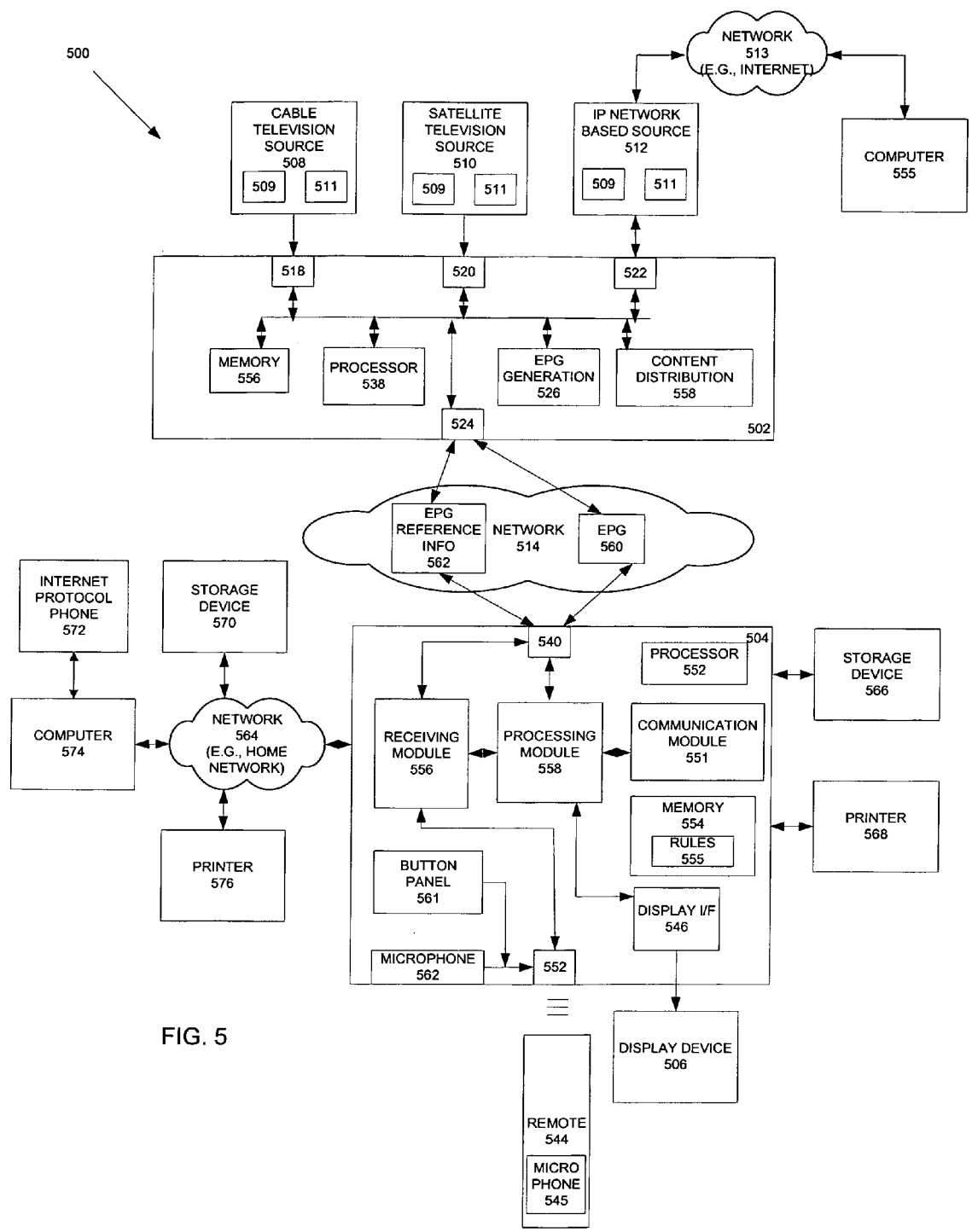
FIG. 5 is a diagram of an example network architecture for devices, machines, services, systems, and instructions to interact and perform any one or more of the methodologies discussed herein, according to an example embodiment of the disclosure.
Figure 6:
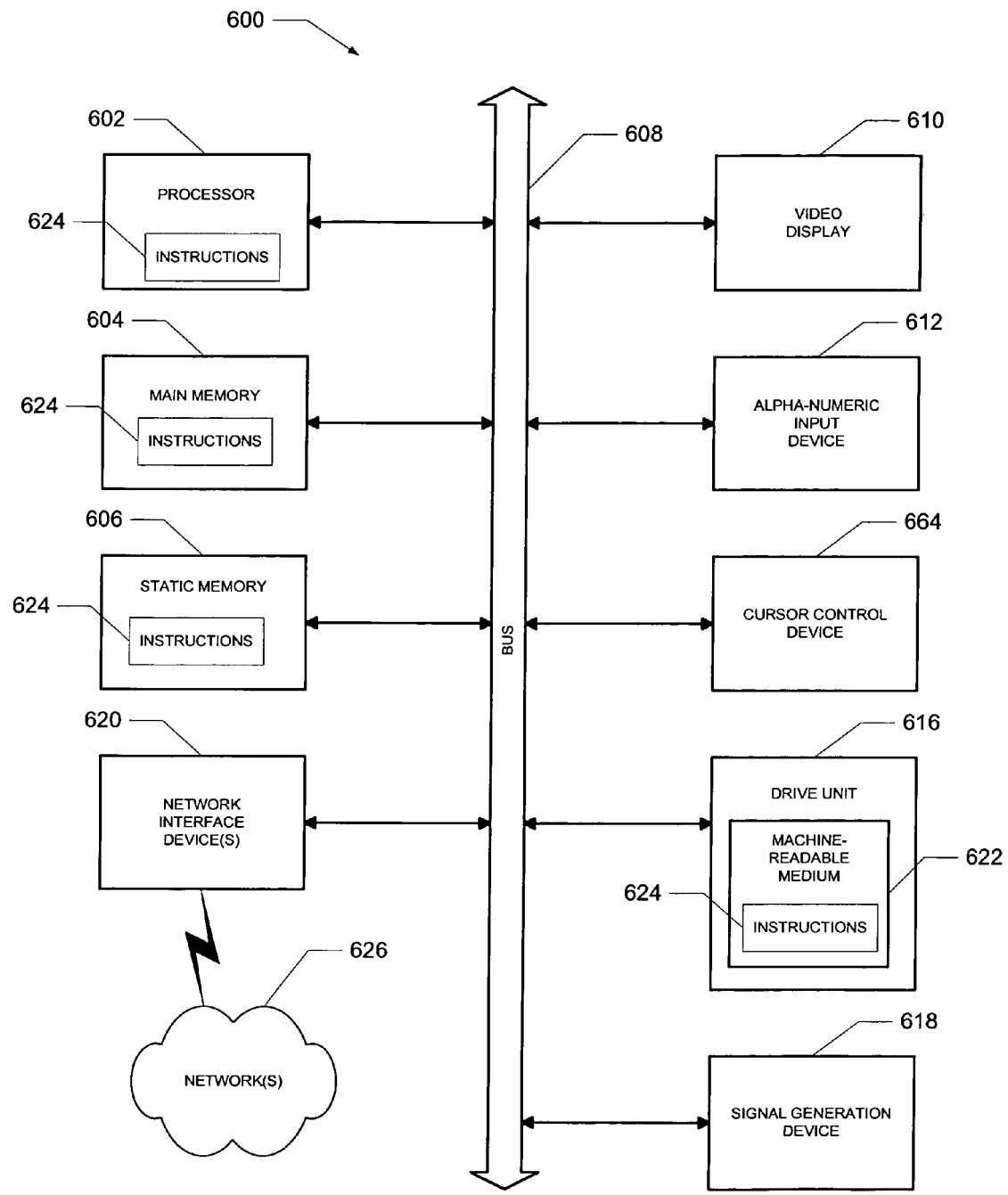
FIG. 6 is a diagram of an example machine architecture within which a set of instructions for causing the machine to perform any one or more of the methodologies discussed herein may be executed, according to an example embodiment of the disclosure.

FIGS. 5-6 are now presented for purposes of providing an example network architecture and machine architecture for which devices can interact to achieve the teachings and techniques presented herein. This layout and configuration is presented for purposes of illustration only and is not intended to limit the embodiments presented herein.

FIG. 5 is a diagram of an example network architecture 500 for devices, machines, services, systems, and instructions to interact and perform any one or more of the methodologies discussed herein, according to an example embodiment of the disclosure.

FIG. 5 may also be viewed as an example multimedia distribution system 500 that is implemented in accordance with at least one embodiment of the present disclosure. As shown, the system 500 includes a multimedia content provider 502, a set-top box 504, a display device 506, a plurality of multimedia content sources, such as cable television source 508, satellite television source 510, and IP network-based source 512.

In the illustrated embodiment, the content provider 502 and the set-top box 504 are connected via a network 514, where the network 514 can include a cable television distribution network, a satellite distribution network, a broadcast television distribution network, a data packet-based computer network (e.g., an Ethernet network), and the like. Likewise, the content sources 508, 510, and 512 may be connected via one or more networks to the content provider 502.

As shown, the content provider 502 can include one or more interfaces 518, 520, and 522 to interface with the content sources 508, 510, and 512, respectively, and an interface 524 to interface with the set-top box 504 via the network 514. The interfaces 518, 520, 522, and 524 may include any of a variety of local network interfaces, such as a coaxial cable interface, an Ethernet, and a HPNA. The IP Network based source 512 is shown to be connected to a computer 515 over a network 513 (e.g., Internet) thereby providing a communication path between a user operating the set-top box 504 and a user operating the computer 515. The content provider 502 further may include an EPG generation module 526 and a multimedia content distribution module 528. The modules 526 and 528 may be implemented as software, hardware, firmware, or combinations thereof. To illustrate, the content provider 502 may include a memory 536 (e.g., static random access memory (SRAM)) and one or more processors 538, where the modules 526 and 528 may be implemented in part or in whole as executable instructions stored in the memory 536 and executed by the processor 538 to perform the techniques described herein.

As also shown, the set-top box 504 may include an interface 540 for interfacing with the content provider 502 via the network 514, a control interface 542 to receive user input and commands, (e.g., via a remote control 544, a button panel 561, a microphone 562) and a display interface 546 to interface with the display device 506. The interface 540 may include any of a variety of appropriate interfaces, such as a coaxial cable interface, a wireless interface to send and receive wireless transmissions, or a data packet-based network interface, such as an Ethernet interface. The control interface 542 may include any of a variety of interfaces, such as an infrared interface, a wireless interface, or the button panel 561. The remote control 544 is shown to include a microphone 545 for receiving voice commands and the set-top box 504 is also shown to include a microphone 562 for receiving voice commands.

The set-top box 504 is further shown to be connected to or to have an integrated storage device 566 (e.g., DVR, hard disk, compact disk, floppy, universal serial bus key, etc.) for storing files, a printer 568 for printing files, and a network 564 (e.g., home network). The network 564, in one embodiment, may connect the set-top box 504 to a computer 574 that is connected to an internet protocol phone 572, a storage device 570 for storing electronic files, and a printer 576. The set-top box 504 further may include a processing module 558, a receiving module 556, and a communication module 551. The processing module 558, receiving module 556, and communication module 551 may be implemented as hardware, software, firmware, or combinations thereof. To illustrate, the set-top box 504 may include a memory 554 and one or more processors 552, where one or both of modules 548 and 550 are implemented as executable instructions stored in memory 554 and executed by the processor 552 to implement techniques described herein. The memory is further shown to include rules 555 that may be utilized to control the use of images that may be captured from content that is displayed on the display device 506. For example the rules 555 may embodied as a digital rights management license that may be distributed with content from the content source 508, 510, and 512. As is well known in the art, the license may include rules 555 that may restrict the use of the associated content.

In a particular embodiment, the content provider 502 receives data representative of multimedia channels from each of the different content sources 508, 510, and 512, and provides data representative of at least a subset of the multimedia channels to the set-top box 504 for processing and display at the display device 506 and/or output via an audio device (not shown). In one embodiment, the content provider may include a content module 509 that communicates data that includes content and a control module 511 that may communicate data that includes control information (e.g., digital license) that may include a rule that restricts the use of associated content. Moreover, in a particular embodiment, the content provider 502 may provide data representative of an electronic programming guide (EPG) 560 to the set-top box 504 for processing by the processing module 558 and for navigation by a user via the control interface 542 and the processing module 558. As described herein, the EPG 560, in one embodiment, represents a unified EPG including listings for the multimedia channels provided by two or more content sources that provide multimedia channels to the content provider 502. To illustrate, in a particular embodiment, the EPG 560 represents a navigable program guide or user interface whereby a user, via the remote control 544 or other input device, can direct the processing module 550 to navigate between multimedia channels by selecting an icon or other graphical representation of the desired channel as represented by a graphical display of the EPG 560. The EPG 560 may combine representations of all of the multimedia channels from different content sources in a single list or different lists for different content sources may be displayed concurrently by the EPG 560. Moreover, multimedia channels may be organized within the EPG 560 based on any of a variety of characteristics, such as by the program content of the multimedia channels, where the program content describes the genre or categorization of the video/audio program represented by the multimedia channel. Examples of various genres or categories include a "comedy" genre, an "action" genre, a "family" genre or "children" genre, a "romance" genre, a "science-fiction" genre, and the like.

FIG. 6 is a diagram of an example machine architecture within which a set of instructions for causing the machine to perform any one or more of the methodologies discussed herein may be executed, according to an example embodiment of the disclosure.

Accordingly, FIG. 6 shows a diagrammatic representation of machine in the example form of a computer system 600 within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU) a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a cursor control device 614 (e.g., a mouse), a disk drive unit 616, a signal generation device 618 (e.g., a speaker) and a network interface device 620.

The disk drive unit 616 includes a machine-readable medium 622 on which is stored one or more sets of instructions (e.g., software 624) embodying any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable media.

The software 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, optical and magnetic media, and carrier wave signals.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

What is claimed is:

1. A method comprising:
   receiving, by a system comprising a processor, first internet protocol video which comprises encrypted internet protocol video content from an external source, wherein the external source is external to a home viewing network;
   detecting, by the system, second internet protocol video from a local source which comprises unencrypted internet protocol video content, wherein the local source is located within the home viewing network, wherein the local source is a security camera, wherein the first internet protocol video and the second internet protocol video are received over a common network feed;
   recognizing, by the system, a source input associated with a television, wherein the first internet protocol video is viewable on the television through the source input when a first channel is selected;
   presenting, by the system, an interface at the television to receive user input to assign an internet protocol address to the local source and to assign the second internet protocol video to a selected channel;
   receiving, by the system, user input;
   assigning, by the system, the internet protocol address to the local source according to the user input;
   assigning, by the system, the second internet protocol video to the selected channel according to the user input for viewing the second internet protocol video at the television through the source input associated with the television at the selected channel;
   converting, by the system, the unencrypted internet protocol video content of the second internet protocol video from a first format to a second format suitable for presentation on the television to generate reformatted unencrypted internet protocol video content; and
   providing the first internet protocol video and the second internet protocol video for selective presentation at the television to allow a simultaneous viewing of the reformatted unencrypted internet protocol video content from the local source with the encrypted internet protocol video content from the external source in a picture-in-picture format;
   wherein the unencrypted internet protocol video content and the encrypted internet protocol video content is transmitted by a common residential gateway over the home viewing network via an Ethernet connection to the system using internet protocol communications.

2. The method of claim 1, wherein the security camera comprises an internet protocol video camera, and wherein the assigning further comprises receiving, by the system, the second internet protocol video as a live feed from the internet protocol video camera located within the home viewing network.

3. The method of claim 1, wherein the system comprises a set-top box.

4. A method comprising:
   assigning, by a system comprising a processor, a set of channels on a television for viewing encrypted internet protocol video content that is received and that is associated with television programming;
   permitting, by the system, a channel from the set of channels to be associated with unencrypted internet protocol video content generated by a local source transmitted within a home viewing network using internet protocol communications, wherein the encrypted internet protocol video content and the unencrypted internet protocol video content are received over a common network feed;
   presenting, by the system, a graphical user interface at the television to receive user input to assign an internet protocol address to the local source and to assign the unencrypted internet protocol video content to a selected channel from the set of channels;

receiving, by the system, user input;
assigning, by the system, the internet protocol address to the local source according to the user input;
assigning, by the system, the unencrypted internet protocol video content to the selected channel according to the user input for viewing the unencrypted internet protocol video content at the television through the common network feed at the selected channel;
converting, by the system, the unencrypted internet protocol video content from a first format to a second format suitable for presentation on the television to generate reformatted unencrypted internet protocol video content;
providing, by the system, the reformatted unencrypted internet protocol video content and the encrypted internet protocol video content for a simultaneous presentation in a picture-in-picture format at the television; and
wherein the unencrypted internet protocol video content and the encrypted internet protocol video content are transmitted by a shared residential gateway over the home viewing network.

5. The method of claim 4, wherein permitting further comprises identifying the channel in response to a viewer-supplied instruction.

6. The method of claim 4 further comprising, recording the unencrypted internet protocol video content in response to a viewer-supplied instruction that identifies the channel for recording, a date and time for recording, and a length of recording time.

7. The method of claim 4 wherein the picture-in-picture is presented in a selected one of the set of channels.

8. The method of claim 4 wherein providing comprises providing for presentation of the unencrypted internet protocol video content at the television for viewing in response to a viewer-selection of the selected channel assigned to the unencrypted internet protocol video content.

9. The method of claim 8, wherein the unencrypted internet protocol video content is provided for presentation at a viewer-configured frames-per-second rate.

10. A system comprising:
a memory storing computer instructions; and
a processor coupled to the memory, wherein the processor, responsive to executing the computer instructions, performs operations comprising:
receiving from a residential gateway encrypted video content from an external source and unencrypted video content from a local source over a common network feed, wherein the residential gateway routes the encrypted video content associated with television programming supplied from the external source to a home viewing network, and wherein the residential gateway routes the unencrypted video content from the local source within the home viewing network;
presenting, by the system, a graphical user interface at a television to receive user input to assign an internet protocol address to the local source and to assign the unencrypted video content to a selected channel;
receiving, by the system, user input;
assigning, by the system, the internet protocol address to the local source according to the user input;
assigning, by the system, the unencrypted video content to the selected channel according to the user input for viewing the unencrypted video content at the television through the common network feed at the selected channel;
selectively and simultaneously presenting the encrypted video content from the external source and the unencrypted video content from the local source at the television on different channels by way of a common source input associated with the television,
wherein the unencrypted video content and the encrypted video content are transmitted by the residential gateway over an Ethernet connection.

11. The system of claim 10, wherein the system comprises a set-top box.

12. The system of claim 10, wherein the graphical user interface further receives user input to set a recording of the unencrypted video content, or to set a frames-per-second display rate for presenting the unencrypted video content on the television.

13. The system of claim 10, wherein the operations further comprise converting the unencrypted video content from a first format to a second format for presentation at the television.

14. A method comprising:
receiving, by a system comprising a processor, first internet protocol video which comprises encrypted video content from an external source, wherein the external source is external to a home viewing network;
detecting, by the system, second internet protocol video which comprises unencrypted video content from a local source, wherein the local source is located within the home viewing network, wherein the first internet protocol video and the second internet protocol video are received over a common network feed, and wherein an internet protocol address is assigned to the local source supplying the second internet protocol video according to user input supplied to the system;
recognizing, by the system, a source input associated with a television, wherein the first internet protocol video is viewable on the television through the source input when a first channel is selected;
assigning, by the system, the second internet protocol video to a second channel, wherein the second internet protocol video is viewable at the television through the source input and the second channel; and
providing the first internet protocol video comprising the encrypted video content and the second internet protocol video comprising the unencrypted video content for simultaneous presentation within a single viewing screen of the television;
wherein the receiving further comprises receiving the first internet protocol video in an encrypted format and decrypting the encrypted format for viewing on the first channel,
wherein the detecting further comprises detecting the second internet protocol video as a live feed in an unencrypted format being streamed within the home viewing network, and
wherein the second internet protocol video in the unencrypted format and the first internet protocol video in the encrypted format is transmitted by way of a shared residential gateway over the home viewing network.

* * * * *